(12) United States Patent
Loncle et al.

(10) Patent No.: US 11,512,643 B2
(45) Date of Patent: Nov. 29, 2022

(54) FASTENING DEVICE FOR A HEAT-SHIELD PANEL

(71) Applicant: Safran Nacelles, Gonfreville l'Orcher (FR)

(72) Inventors: Alexis Loncle, Moissy Cramayel (FR); Jérémie Rabineau, Moissy Cramayel (FR); François Bellet, Moissy Cramayel (FR); Cédric Renault, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 333 days.

(21) Appl. No.: 16/876,776

(22) Filed: May 18, 2020

(65) Prior Publication Data

US 2020/0277900 A1    Sep. 3, 2020

Related U.S. Application Data

(63) Continuation of application No. PCT/FR2018/052851, filed on Nov. 15, 2018.

(30) Foreign Application Priority Data

Nov. 16, 2017    (FR) ...................................... 1760819

(51) Int. Cl.
*F02C 7/24* (2006.01)
*B64D 29/00* (2006.01)
(Continued)

(52) U.S. Cl.
CPC ................ *F02C 7/24* (2013.01); *B64C 1/403* (2013.01); *B64C 7/02* (2013.01); *B64D 29/00* (2013.01);
(Continued)

(58) Field of Classification Search
CPC . F02C 7/24; F02C 7/045; B64C 1/403; B64C 7/02; B64D 29/00; B64D 29/06;
(Continued)

(56) References Cited

U.S. PATENT DOCUMENTS

| 7,584,582 | B1 | 9/2009 | Hutter, III |
| 2005/0029404 | A1* | 2/2005 | Hogie ................... F16B 5/0642 244/171.1 |

(Continued)

FOREIGN PATENT DOCUMENTS

| EP | 0465983 | 1/1992 |
| EP | 1296090 | 3/2003 |

(Continued)

OTHER PUBLICATIONS

International Search Report for International Application PCT/FR2018/852851, dated Feb. 4, 2019.

*Primary Examiner* — Todd E Manahan
*Assistant Examiner* — Rene D Ford
(74) *Attorney, Agent, or Firm* — Burris Law, PLLC (57) ABSTRACT

A device for securing at least one thermal protection mat to an internal fixed structure of a nacelle includes at least one removable fastening element for securing the at least one thermal protection mat to the internal fixed structure designed to be arranged between the mat and the internal fixed structure. The device includes at least one gripping element connected to the removable fastening element to project relative to the mat on the opposite side to the internal fixed structure, the removable fastening element being intended to be detached from the internal fixed structure by a pulling force exerted on the gripping element.

15 Claims, 3 Drawing Sheets

(51) Int. Cl.
*B64C 7/02* (2006.01)
*B64C 1/40* (2006.01)
*F02K 1/82* (2006.01)
*B64D 29/06* (2006.01)
*F16B 11/00* (2006.01)
*F16L 59/02* (2006.01)
*F02C 7/045* (2006.01)

(52) U.S. Cl.
CPC ............. *B64D 29/06* (2013.01); *F02K 1/822* (2013.01); *F02K 1/827* (2013.01); *F02C 7/045* (2013.01); *F16B 11/006* (2013.01); *F16L 59/026* (2013.01)

(58) Field of Classification Search
CPC ........ F02K 1/822; F02K 1/827; F16B 11/006; F16B 5/0621; F16L 59/026; F16L 59/12; F16L 59/028
See application file for complete search history.

(56) References Cited

U.S. PATENT DOCUMENTS

| | | | |
|---|---|---|---|
| 2005/0211839 A1* | 9/2005 | Movsesian | B32B 27/285 244/119 |
| 2009/0226663 A1* | 9/2009 | Hutter, III | F16B 37/048 428/99 |
| 2011/0067951 A1* | 3/2011 | Muller | F16L 55/035 181/284 |
| 2012/0181359 A1* | 7/2012 | Welch | F02C 7/24 239/589 |
| 2015/0232190 A1* | 8/2015 | Provost | B64C 1/403 244/54 |
| 2015/0300396 A1* | 10/2015 | Balderrama | F16B 37/048 411/373 |
| 2017/0226931 A1* | 8/2017 | Bellet | F02K 1/822 |

FOREIGN PATENT DOCUMENTS

| | | |
|---|---|---|
| EP | 2855948 | 4/2015 |
| FR | 3019599 | 10/2015 |

\* cited by examiner

Fig. 5

FASTENING DEVICE FOR A HEAT-SHIELD PANEL

CROSS-REFERENCE TO RELATED APPLICATIONS

This application is a continuation of International Application No. PCT/FR2018/052851, filed on Nov. 15, 2018, which claims priority to and the benefit of FR 17/60819 filed on Nov. 16, 2017. The disclosures of the above applications are incorporated herein by reference.

FIELD

The present disclosure relates to relates to a device for fastening at least one heat-shield mat on an inner fixed structure of a turbojet engine nacelle.

BACKGROUND

The statements in this section merely provide background information related to the present disclosure and may not constitute prior art.

An aircraft is propelled by one or several propulsion unit(s) such as turbojet engines each housed within one nacelle.

A nacelle generally has a substantially tubular structure comprising an air inlet upstream of the turbojet engine, an intermediate section intended to surround a fan of the turbojet engine and a rear section adapted to integrate thrust reversal means and intended to surround the combustion chamber and all or part of the compressor and turbine stages of the turbojet engine, and generally terminates in an ejection nozzle whose outlet is located downstream of the turbojet engine.

Modern nacelles are generally intended to accommodate a bypass turbojet engine adapted to generate, on the one hand, a hot air flow (also called primary flow) coming from the combustion chamber of the turbojet engine and circulating within a space delimited by a substantially tubular shaped compartment called "core" compartment, and on the other hand, a cold air flow (called secondary flow) coming from the fan and circulating outside the turbojet engine through an annular passage, also called flow path, formed between an inner structure defining a fairing of the turbojet engine and an inner wall of the nacelle. The two air flows are ejected from the turbojet engine by the rear of the nacelle.

The "core" compartment comprises an outer envelope serving as a casing and called inner fixed structure (IFS).

This inner fixed structure is subjected to high thermal stresses and it is necessary to protect it using heat-shield panels or mats, allowing in particular insulating the components of the nacelle from the engine environment in order to keep them at acceptable temperatures and thus prolong their service life.

These heat shields also provide a fire-resistant shielding and may also be used in other areas of the nacelle, at the level of which there is a fire hazard.

In order to thermally protect the IFS, it is known to resort to shield panels, disposed for example on the "core" compartment side, and comprising at least one insulating mat, generally manufactured from silica, ceramic or a microporous material fibers, said mat being sandwiched between straps generally made of stainless steel.

The heat-shield mats are fastened to the IFS using fastening systems which punctually cooperate with the IFS over the entire shielding surface, in the same manner as rivets. The heat-shield mat is also retained to the IFS at the level of the edges by retaining tapes commonly called "retainers."

Such fastening systems are already known. For example, it is known to use a brake wire system generally comprising two portions: a base fastened into the IFS and carrying a hooking structure (such as for example a hook, a ring or an eyelet fastener), and a retaining button.

The hooking structure fits partially inside a corresponding fastening orifice of the mat, and is adapted to receive a link called brake wire. The retaining button bears against an external surface of the mat so as to form a holding and tightening washer, the retaining button being provided with orifices for the passage of the brake wire whose ends are twisted and tightened.

Thus, the retention of the panel on the IFS is ensured.

In order to enhance the shielding, the twisted end of the brake wire is then embedded into silicone.

Alternatively, the brake wire system may be replaced by a threaded or tapped hooking structure cooperating with a complementary end of the retaining button. Nonetheless, such screwed systems are heavy, have a higher cost and are not very thermally efficient.

The brake wire attachment systems generally have the drawback of requiring dismounting the heat shield, in case of breakage of a brake wire, in order to be able to access the concerned hooking structure and replace the brake wire. Hence, when replacing a simple brake wire, the intervention time is long and detrimental whether during maintenance or during production.

Furthermore, the installation of the heat-shield mats, with brake wire attachment systems, is not easy during production: this makes it necessary to install all of the hooking structures and associated brake wires before the lay-up of the heat-shield mats, and then recover them at the surface.

In order to overcome these drawbacks, adhesive mechanical fastening systems, for example by flexible hooks and loops, such as the Velcro® brand, are alternatively used.

However, with the use of such tapes, the heat-shield mats are regularly deteriorated by being torn during dismount.

SUMMARY

This section provides a general summary of the disclosure and is not a comprehensive disclosure of its full scope or all of its features.

The present disclosure provides a fastening device which is both relatively easy to produce and install during manufacture, and to change/repair during maintenance, while providing improved integrity of the heat-shield mats during these operations, in particular during dismounts.

To this end, the present disclosure relates to a device for fastening at least one heat-shield mat to an inner fixed structure of a nacelle, the fastening device comprising at least one removable fastening element for fastening the at least one heat-shield mat to the inner fixed structure arranged so as to be disposed between the mat and said inner fixed structure, the fastening device being characterized in that it includes at least one gripping element connected to the removable fastening element and arranged so as to project outwardly from the mat, on the side opposite to the inner fixed structure.

Thanks to such a configuration, an operator can easily detach the removable fastening element by exerting a tension on the gripping element with a predetermined force.

Thus, the removable fastening element is intended to be detached from the inner fixed structure by a tension force exerted on the gripping element.

Moreover, the use of a gripping element projecting outwardly from the mat and connected with the removable fastening element enables the removal of the mat without a reduced risk of tearing it. Indeed, the tension force for the removal of the heat-shield mat is then applied directly on the gripping element, namely directly on the fastening device, and not directly on the heat-shield mat.

According to a particular technical feature, the fastening element includes a first portion configured to be fastened to the inner fixed structure and a second portion connected to the gripping element, the first and second portions cooperating with each other in a removable manner.

This cooperation is configured so that the tension force to be exerted on the gripping element is low enough for an operator being able to manually overcome it, but high enough to provide holding of the heat shield, in particular by its own weight, against the inner fixed structure.

According to an advantageous configuration, the removable fastening element includes a self-gripping adhesive tape, and in one form is a mechanical fastening device with flexible hooks and loops, for example textile or metallic, such as the Velcro® brand. Thus, in such a configuration, a first portion of the fastening device is closed by an adhesive tape provided with hooks and the second portion is formed by a complementary adhesive tape, provided with loops, the first and second portions cooperating with each other by assembly of the hooks with the loops.

According to a particular arrangement, the fastening device is configured to be disposed between two heat-shield mats so as to sandwich edges of said heat-shield mats or cross an orifice of a heat-shield mat so as to sandwich edges of this orifice.

According to a particular feature, the fastening device is arranged so as to provide fastening of an intermediate structure supporting the gripping element, such as a button provided with a gripping ring. In particular, the function of this intermediate support is to sandwich the heat-shield mat(s) with the IFS.

According to another technical feature, the fastening device includes a complementary heat-shield insert arranged so as to sandwich said edges, the fastening device comprising a link crossing the insert, and connected to the removable fastening element on one side of the heat-shield insert proximal to the inner fixed structure, and projecting from the insert on the opposite side, for example by forming a gripping loop forming the gripping element.

According to a particular feature, the fastening device comprises a link arranged so as to cross the mat, connected to the removable fastening element on the side of the inner fixed structure, and arranged so as to project from the mat on the opposite side, for example by forming a gripping loop forming the gripping element.

In this case, the crossing link is advantageously connected to a clevis, for example metallic, arranged so as to be secured to the mat, on the side of the inner fixed structure, that is to say opposite the IFS, the removable fastening element being fastened (at least partially) on said clevis.

According to another feature, the removable fastening element is arranged so as to continuously extend between two bonded heat-shield mats so as to project from the mat, the gripping element being formed by one end of the fastening element.

According to another aspect, the present disclosure also concerns an assembly of an inner fixed structure of a nacelle of an aircraft propulsion unit and of a heat shield including at least one heat-shield mat, the assembly being characterized in that the heat shield is fastened to the inner fixed structure by at least one fastening device including all or part of the aforementioned features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
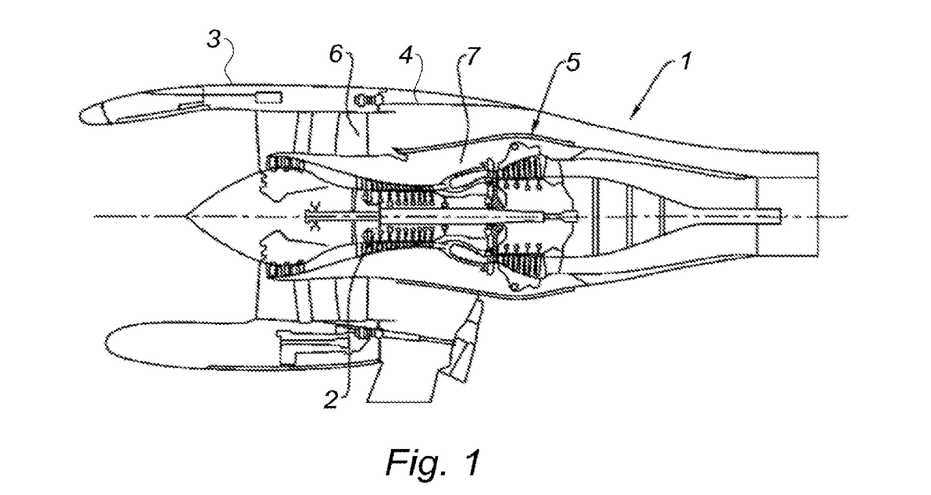
FIG. 1 illustrates a longitudinal cross-sectional view of an aircraft propulsion unit to which the teachings of the present disclosure are applied.

FIG. 1 is a longitudinal sectional view of an aircraft propulsion unit 1, including a turbojet engine 2 housed within a nacelle 3. The nacelle 3 includes an outer fixed structure 4 (or OFS, standing for "Outer Fixed Structure") and an inner fixed structure 5 (or IFS, standing for "Inner Fixed Structure"). These two structures are concentric and define a flow path 6 in which cold air circulates when the turbojet engine 2 is operating. The inner fixed structure 5 forms the outer envelope of the "core" compartment 7 of the turbojet engine 2.

FIGS. 2 to 5 illustrate different forms of devices 10 for fastening at least one heat-shield mat 9 to an inner fixed structure 5 (IFS) of a nacelle 3.

The fastening device 10 comprises at least one removable element 11 for fastening the heat-shield mat 9 to the inner fixed structure 5.

The removable fastening element 11 is disposed between said mat 9 and said inner fixed structure 5.

According to the present disclosure, the fastening device 10 includes at least one gripping element 12 connected to the removable fastening element 11 and arranged so as to project from the mat 9 on the side opposite to the inner fixed structure 5.

In this manner, during an operation of removing the heat-shield mat 9, an operator has only to pull on the gripping element 12 which exerts a force directly on the removable fastening element and not on the heat-shield mat 9. Hence, the risk of tearing the heat-shield mat 9 is reduced.

In one form, the removable fastening element 11 is a self-gripping adhesive tape. In another form, the removable fastening element 11 includes flexible hooks and loops, for example textile or metallic hooks and loops, such as the Velcro® brand.

Advantageously, in one form these self-gripping adhesive tapes are metallic, thereby allowing withstanding high temperatures.

More generally, the fastening element 11 includes a first portion 11A configured to be fastened to the inner fixed structure 5, for example by gluing thanks to the adhesive on the adhesive tape, and a second portion 11B connected to the gripping element 12, the first and second portions 11A, 11B cooperating with each other in a removable manner.

Figure 2:
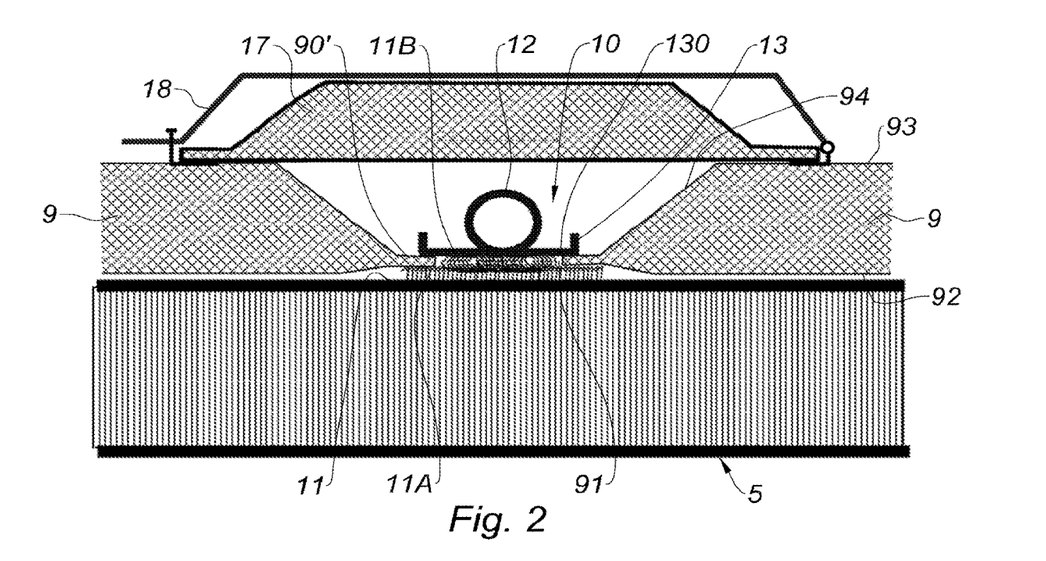
FIG. 2 illustrates a schematic cross-sectional view of a device for fastening at least one heat-shield mat to an inner fixed structure of a nacelle according to a first form of the present disclosure.

FIG. 2 illustrates a schematic cross-sectional view of a fastening device 10 according to a first form of the present disclosure.

The heat shield includes a heat-shield mat 9. The mat 9 includes a face in contact with the IFS 5, called inner face 92, and an opposite face, called outer face 93. In this example, the inner 92 and outer 93 faces of the mat 9 are covered with sheet metals.

The mat 9 is fastened to the IFS 5 by means of a plurality of fastening devices 10.

In this configuration, the fastening device 10 may be used either to sandwich edges 90 of said heat-shield mats 9, or to cross, at least partially, an orifice 91 of a heat-shield mat 9 so as to sandwich edges 90' of this orifice 91, as is more specifically the case in this figure. In other words, this fastening device may be used to fasten the heat-shield mat 9 at the level of its edges 90 or at any location thereover, by disposing an orifice 91 crossing the mat 9 across the entire thickness thereof.

The fastening device 10 comprises a fastening element 11 comprising:

a first portion 11A in the form of a self-gripping adhesive tape glued on the inner fixed structure 5 and having a lining of flexible hooks or loops, for example textile or metallic; and a second portion 11B also in the form of a self-gripping adhesive tape, complementary to the tape forming the first portion 11A, that is to say they cooperate with each other in a removable manner and has a lining of loops or hooks, respectively with the regards to the first portion 11A.

The second portion 11B is glued on a wall 130 of an intermediate structure 13 on which the gripping element 12 is secured. In particular, said gripping element 12 is located on an external side of said wall 130 opposite to the internal side on which the second portion 11B of the fastening element 11 is fastened. In this manner, the fastening device 10 provides fastening of the intermediate structure supporting the gripping element 12.

The gripping element 12 is shaped as a loop, herein metallic, integrally formed in one-piece with the wall 130 against which said second portion 11B of the self-gripping adhesive tape is bonded.

In the fastening position of the mats, the edges 90' of the orifice or opening 91 are sandwiched along the entirety of the closed contour thereof between, on the one hand the inner fixed structure 5 and, on the other hand, the intermediate structure 13, in the space delimited between said edges 90'. In other words, the two portions 11A, 11*b* of the self-gripping adhesive tape or hook and loop fasteners cooperate together through the orifice 91 of the mat 9.

On the side of the mat 9 opposite the orifice 91, there is disposed a recess 94, formed across the thickness of the mat 9 and opening onto the outer face 93 of the mat 9. The recess 94 communicates with the orifice 91 so as to form a passage throughout the mat 9, in order to enable, as explained hereinbefore:

the cooperation of the two portions 11A, 11B of the self-gripping adhesive tape or hook and loop fasteners through said orifice 91 and, concerning the intermediate structure 13, housing it within the space delimited by the recess 94, across the thickness of the mat 9.

In order to provide a local heat-shielding at the level of the fastener, the fastening device 10 is covered by an insulating cap 17 to thermally insulate the fastening device 10 with the mat 9 surrounding it. More specifically, this insulating cap 17 covers the recess 94 on the outer face 93 of the mat 9 in an insulated manner.

This insulating cap 17 is held on the outer face 93 of the mat 9 by an attachment system such as tabs welded on the heat-shield mat 9. In one variant, as illustrated in FIG. 2, the attachment system comprises a "U" shaped metallic vault 18 the base of the "U" thereof is fastened and hinged in a pivot connection on the outer face 93 of the heat-shield mat 9 and each of the two ends thereof is arranged so as to engage in hooks secured to the outer face 93 of the heat-shield mat, located diametrically opposite to the hinge with respect to the insulating cap 17. Such a vault 18 is adapted to be removable thanks to the deformable nature of the metal the metallic vault 18.

Figure 3:
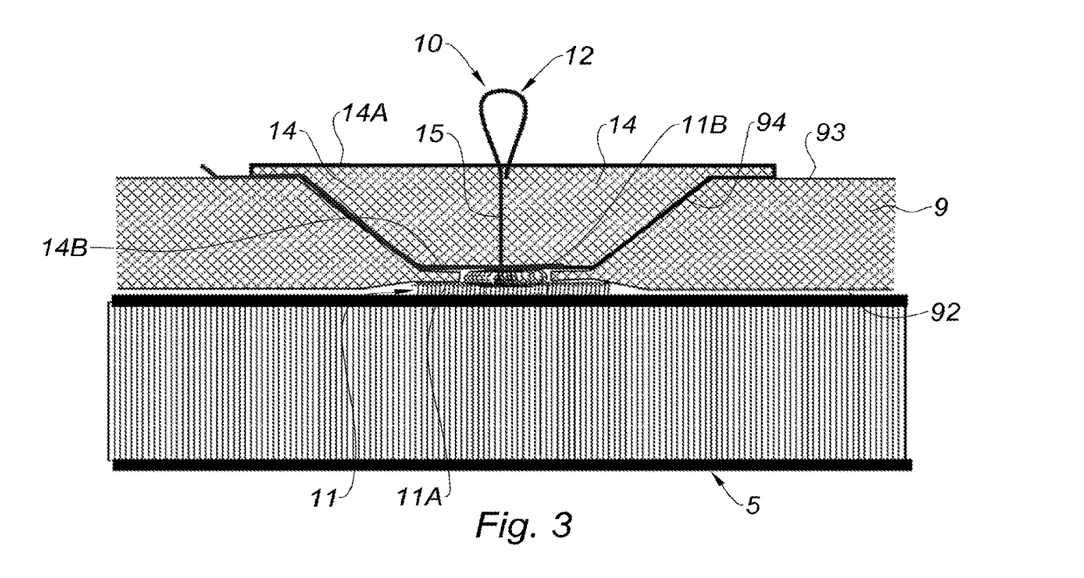
FIG. 3 illustrates a schematic cross-sectional view of a device for fastening at least one heat-shield mat to an inner fixed structure of a nacelle according to a second form of the present disclosure.

FIG. 3 illustrates a schematic cross-sectional view of a fastening device 10 according to a second form of the present disclosure.

In this configuration, the fastening device 10 may also be used either to sandwich edges 90 of two heat-shield mats 9, or to cross at least partially an orifice 91 of a heat-shield mat 9 so as to sandwich edges 90' of this orifice 91, as is more specifically the case in this figure.

In the same manner as in the first form, the fastening device 10 comprises a fastening element 11 comprising:

a first portion 11A in the form of a self-gripping adhesive tape glued on the inner fixed structure 5 and having a lining of hooks or loops; and a second portion 11B also in the form of a self-gripping adhesive tape, complementary to the first portion 11A, that is to say they cooperate with each other in a removable manner and has a lining of loops or hooks, respectively.

This second form differs from the first form essentially in that the second portion 11B of the adhesive tape is glued to an intermediate structure 13 shaped as an insert 14 arranged so as to fit in a substantially complementary manner into the recess 94.

This insert 14 which has a shape complementary to that of the recess 94, has:

an upper surface 14A whose contour locally covers the outer face 93 of the mat over the outer contour of said recess 94; and a lower surface 14B, on which the second portion 11B of the adhesive tape is glued, which, together with the IFS 5, sandwich the edges 90' of the orifice 91 over the contour thereof.

The two portions 11A, 11b of the self-gripping adhesive tape or hook and loop fasteners cooperate together through the orifice 91 of the mat 9.

The second portion 11B of the self-gripping adhesive tape may be glued directly on the lower surface 14B of the insert 14 or, alternatively, be glued on a clevis 16 (not illustrated in FIG. 3) which is secured for example to the lower surface 14B of the insert 14.

Figure 4A:
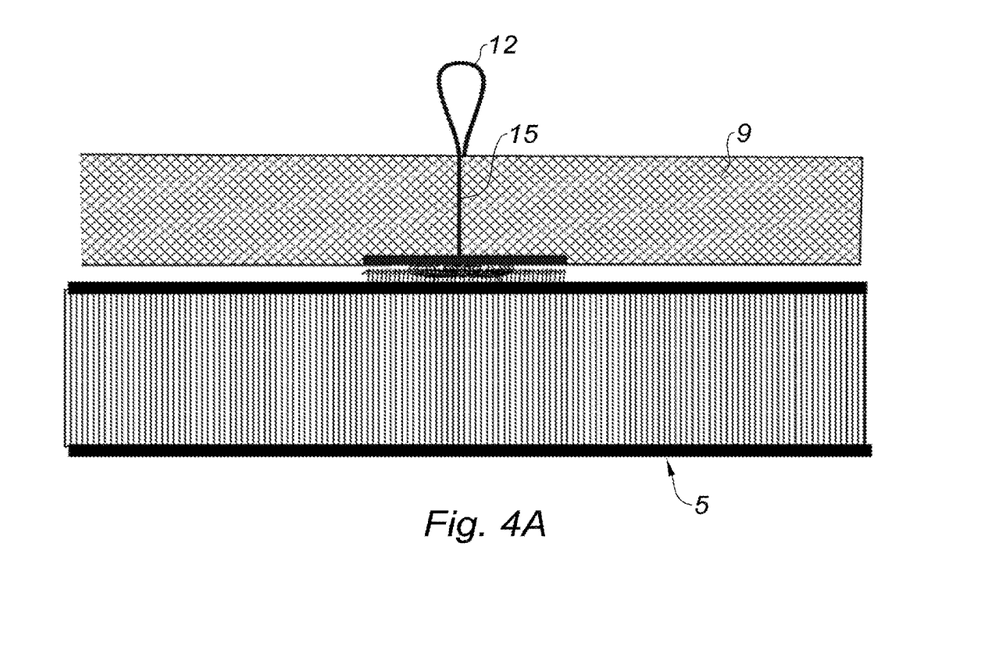
FIGS. 4A and 4B illustrate schematic cross-sectional views of a device for fastening at least one heat-shield mat to an inner fixed structure of a nacelle according to a third form of the present disclosure.
Figure 4B:
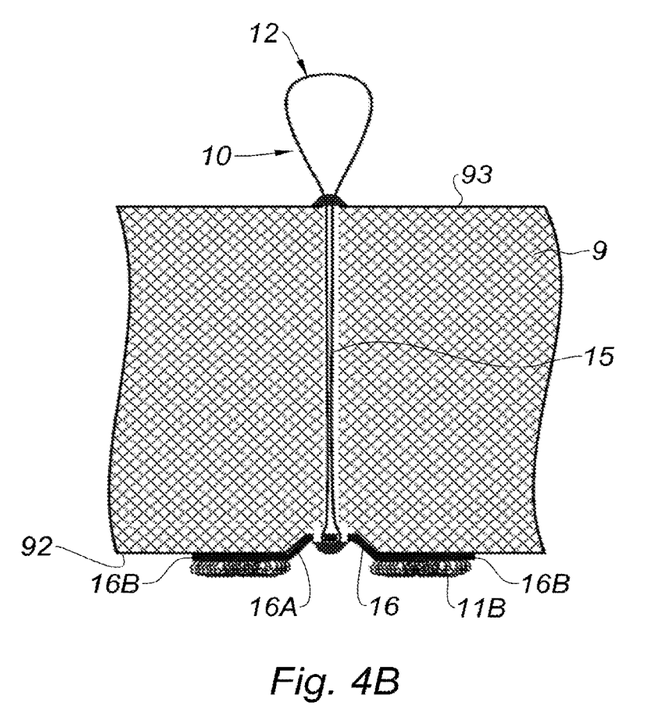

This clevis 16 may be similar to that of the third form, which is illustrated in more detail in FIG. 4B.

In one form, this insert 14 is made of the same material as that of the mats 9, that is to say of silica, ceramic or a microporous material fibers, said mat being sandwiched between straps generally made of stainless steel.

The heat-shield insert 14 is arranged so as to sandwich said edges 90' of the orifice 91.

The fastening device 10 comprises a link 15 crossing the insert 14, connected to the removable fastening element 11 on the side of the orifice 91 and of the inner fixed structure 5, opposite thereto, the link 15 projecting from the insert 14 on the opposite side, that is to say projecting from the external surface 14A. In particular, the second portion 11B of the self-gripping adhesive tape is glued directly on the lower surface 14B of the insert 14 formed from a metallic strap, the link 15 being fastened to this strap of the lower surface 14B of the insert 14 and crossing the insert across the thickness thereof so as to project outwardly.

In this form, the link 15 is a stainless steel cable. The end of the link 15 projecting outwardly is arranged so as to form a loop forming the gripping element 12 and facilitate handling by an operator so as to be able to easily exert a tension force on this cable, and therefore indirectly on the mats 9 for the removal of the IFS 5.

In an alternative, and possibly complementary, configuration, instead of crossing the insert 14, the link 15 may be disposed in the recess 94, between the insert 14 and the heat-shield mat 9.

In other words, in this case, the link 15 is arranged so as to continuously extend between the bonded heat-shield mat 9 and the insert 14 so as to project outwardly from the mats 9, the gripping element 12 being formed by one end of this link 15.

In such a configuration, and in same manner as it crosses the insert 14, the link 15 is also fastened to the lower surface 14B of the insert 14 or, where appropriate, to a clevis 16 (not illustrated in FIG. 3) and its end projects outwardly and is arranged so as to form a loop.

Alternatively, the removable fastening element 11 has a continuous extension, between the heat-shield mat 9 and the insert 14, from the self-gripping adhesive tape which is glued on (or secured to) the lower surface 14B of the insert 14, so as to project from the mats 9, the gripping element 12 being formed by one end of the fastening element 11. This configuration is relatively similar to the fourth form described hereinafter with reference to FIG. 5.

This second form is advantageous in comparison with the first form, in particular as it allows getting rid of the system for holding the insulating cap which allows facilitating the lay-up of the heat-shield mat 9 and reduced costs.

FIGS. 4A and 4B illustrate schematic cross-sectional views of a fastening device 10 according to a third form of the present disclosure.

This third form is particularly suited to be located at any location over the heat-shield mat 9, and not necessarily on an edge 90 of the latter.

The fastening device 10 comprises, in the same manner as in the first two forms, a fastening element 11 comprising:

a first portion 11A in the form of a self-gripping adhesive tape glued on the inner fixed structure 5 and having a lining of hooks or loops; and a second portion 11B also in the form of a self-gripping adhesive tape, complementary to the first portion 11A, that is to say they cooperate with each other in a removable manner and has a lining of loops or hooks, respectively.

The fastening device 10 comprises a link 15 crossing the mat 9, connected to the removable fastening element 11 on the side of the inner fixed structure 5, opposite thereto so that the second portion 11B carried by the mat 9 is in contact and cooperates in a removable manner with the complementary first portion 11A, the latter being glued on the IFS 5.

The link 15 projects from the mat 9 on the external side, opposite to the IFS 5, that is to say projecting from the outer face 93 of the mat 9. The end of the link 15 projecting outwardly forms a gripping element 12 for gripping by an operator.

In particular, the second portion 11B of the self-gripping adhesive tape is glued by its adhesive on a clevis 16, which is secured for example at the inner face 92 of the mat 9. In one form, the clevis 16 is glued or welded to said inner face 92 of the mat 9. In this instance, this clevis 16 is metallic but it may also be made of a different material, such as a fabric.

The link 15 crossing the heat-shield mat 9 is connected to the clevis 16. This link 15 is a stainless steel cable. This link forms a loop crossing the heat-shield mat 9 across the entire thickness thereof. This link 15 is secured to the clevis 16 on the one hand and to the metallic strap on the outer face 93 of the mat 9 on the other hand, where it projects.

Fastening of the link 15 at the level of the inner face 92, herein via the clevis 16, of the mat 9 allows the removal of the heat-shield cap 9 during maintenance.

Moreover, fastening of the link 15 at the level of the outer face 93, herein through a weld point, of the heat-shield mat 9 allows the proper holding of the mat 9 on the IFS 5, in particular when the clevis 16 is not glued or welded to the mat 9.

In order to limit possible frictions between fastening of the link 15 to the clevis 16, said clevis 16 has, substantially at the center thereof, a substantially cambered central portion 16A laterally bordered by lateral flanges 16B.

As it is cambered in particular on the side of the heat-shield mat 9, the central portion 16A allows defining a space with the IFS 5 in the assembled position so that fastening of the link 15 on the clevis 16, for example a thickness of the cable crossing it or a weld point, could be housed within this space without being in contact with the IFS 5.

In turn, the lateral flanges 16B of the clevis 16 are arranged so as to receive the second portion 11B of the self-gripping adhesive tape which is fastened atop by gluing thanks to its adhesive, so as to come into contact and planar bearing against the first portion 11A of the self-gripping adhesive tape glued on the IFS 5, when in the assembled position.

The end of the link 15 projecting outwardly is also arranged so as to form a loop and facilitate handling by an operator in order to be able to easily exert a tension force on this cable 15.

The advantage of this form in comparison with the first two ones lies in that it does not involve disposing the fastening device throughout an orifice 91 but simply throughout a passage sized only for the passage of the link 15 and not of the hooking surface of the removable fastening element 11, in particular of the first and second portions 11A, 11B.

In this manner, the heat shield is preserved in an improved manner, thanks to the recess 94, such as an insulating cap 17 with a fastening vault 18 or an insert 14.

In other words, this third form allows preserving the integrity of the heat shield without local loss of insulation while reducing the cost by the absence of an insulating cap 17 or insert 14.

Moreover, the loop of the link 15 forming the gripping element 15 allows pulling directly on the self-gripping tape and inhibits damaging the heat shield 9.

Figure 5:
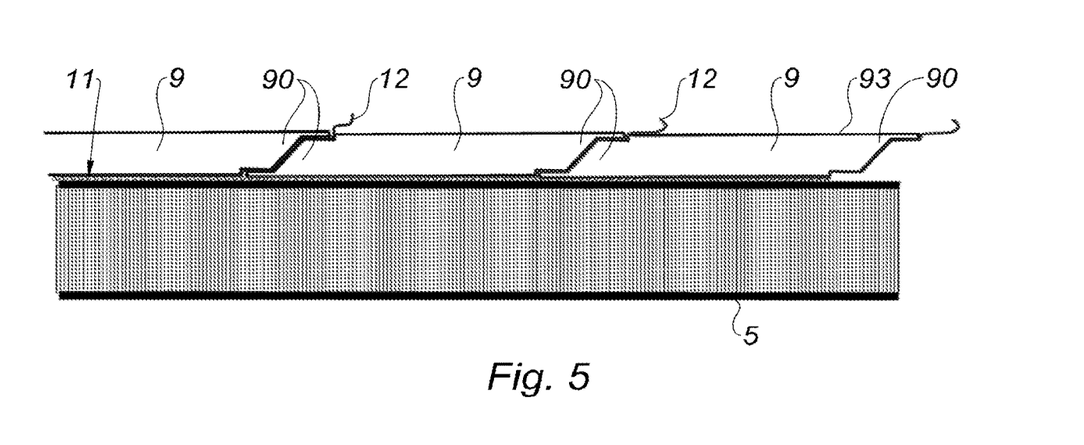
FIG. 5 illustrates a schematic cross-sectional view of a device for fastening at least one heat-shield mat to an inner fixed structure of a nacelle according to a fourth form of the present disclosure.

FIG. 5 illustrates a schematic cross-sectional view of a fastening device 10 according to a fourth form of the present disclosure.

This fourth form is particularly suited to be located at the juncture of two heat-shield mats 9, between two edges 90 thereof.

The fastening device 10 comprises, in the same manner as in the preceding forms, a fastening element 11 comprising:

a first portion 11A in the form of a self-gripping adhesive tape glued on the inner fixed structure 5 and having a lining of hooks or loops; and a second portion 11B also in the form of a self-gripping adhesive tape, complementary to the first portion 11A, that is to say they cooperate with each other in a removable manner and has a lining of loops or hooks, respectively.

The second portion 11B is glued on the inner face 92 of the mat 9 opposite the first portion 11A cooperating therewith.

The removable fastening element 11 is arranged so as to continuously extend between two bonded heat-shield mats 9 so as to project from the mats 9, the gripping element 12 being formed by one end of the fastening element 11.

In other words, in such a configuration, the fastening element 11 is disposed between the IFS 5 and the heat-shield mat 9 and continuously extends in the juncture of two heat-shield mats so as to project outwardly.

More specifically, in one form, only the second portion 11B secured to the heat-shield mat continuously extends between two bonded heat-shield mats 9 so as to project from the mats 9, the first portion 11A being integrally secured to the IFS 5.

In still another form, in such a configuration, the juncture between two heat-shield mats 9 is configured so that the edges 90 of these two mats cooperate together in a complementary manner by superposition on one another.

Such a configuration calls for the gripping element 12, composed by at least one portion of the fastening element 11, to be fire-resistant.

The portion forming the extension of the fastening element 11 is herein in the continuation of the hook and loop type fastener and does not include any lining of hooks or loops so as to limit frictions in the juncture between the two heat-shield mats 9.

Such a fastening device 10 offers many advantages such as those of providing thermal efficiency as the singularities related to through fasteners are reduced. Its simplicity and its price also constitute major advantages of this form.

Moreover, in the context of maintenance, such a solution enables relatively quick and easy mounting and dismounting. During mounting, there may be provided for a protection of the self-gripping tapes, for example of the glass fabrics type, in order to avoid that the hook and loop type fastener or the self-gripping portion of the tapes bond together in a wrong position. In this case, once the heat-shield mat 9 is positioned, the protection may be removed.

The present disclosure is described in the foregoing as example. It shall be understood that those skilled in the art are able to carry out different variants of the present disclosure yet without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A fastening device for fastening at least one heat-shield mat to an inner fixed structure of a nacelle, the fastening device comprising: at least one removable fastening element releasably coupling the at least one heat-shield mat to the inner fixed structure;
at least one gripping element connected to the at least one removable fastening element and arranged to project from the at least one heat-shield mat on a side of the at least one heat-shield mat opposite to the inner fixed structure,
wherein at least a portion of the at least one removable fastening element is configured to be detached from the inner fixed structure by a tension force exerted on the at least one gripping element.

2. The fastening device according to claim 1, wherein the at least one removable fastening element comprises a first portion configured to be fastened to the inner fixed structure and a second portion connected to the at least one gripping element, the first portion and second portion cooperating with each other in a removable manner.

3. The fastening device according to claim 1, wherein the at least one removable fastening element is a self-gripping adhesive tape.

4. The fastening device according to claim 3, wherein the self-gripping adhesive tape is a mechanical fastening device with hooks and loops.

5. The fastening device according to claim 4, wherein the hooks and loops are textile or metallic hooks and loops.

6. The fastening device according to claim 1, wherein the fastening device is configured to be disposed between two heat-shield mats to sandwich edges of the two heat-shield mats.

7. The fastening device according to claim 6 further comprising a complementary heat-shield insert arranged to sandwich the edges of the two heat-shield mats and a link crossing the complementary heat-shield insert, the link being connected to the at least one removable fastening element on a side of the complementary heat-shield insert proximal to the inner fixed structure, and projecting from the complementary heat-shield insert on a side opposite to the side of the complementary heat-shield insert proximal to the inner fixed structure.

8. The fastening device according to claim 1, wherein the fastening device is arranged to fasten an intermediate structure supporting the at least one gripping element.

9. The fastening device according to claim 1 further comprising a link arranged to cross the at least one heat-shield mat, the link being connected to the at least one removable fastening element on a side of the at least one heat-shield mat proximal to the inner fixed structure, and arranged to project from the at least one heat-shield mat on the side of the at least one heat-shield mat opposite to the inner fixed structure.

10. The fastening device according to claim 9, wherein the link is connected to a clevis arranged to be secured to the at least one heat-shield mat on the side of the at least one heat-shield mat proximal to the inner fixed structure, the at least one removable fastening element being fastened on the clevis.

11. The fastening device according to claim 1, wherein the at least one removable fastening element is arranged to continuously extend between two bonded heat-shield mats to project from the two bonded heat-shield mats, the at least one gripping element being formed by one end of the at least one removable fastening element.

12. The fastening device according to claim 1, wherein the fastening device is configured to cross an orifice of the at least one heat-shield mat to sandwich edges of the orifice.

13. The fastening device according to claim 12 further comprising a complementary heat-shield insert arranged so as to sandwich the edges of the orifice and a link crossing the complementary heat-shield insert, the link being connected to the at least one removable fastening element on a side of the complementary heat-shield insert proximal to the inner fixed structure, and projecting from the complementary heat-shield insert on a side opposite to the side of the complementary heat-shield insert proximal to the inner fixed structure.

14. The fastening device according to claim 1, wherein the gripping element includes a loop and the at least a portion of the at least one removable fastening element is configured to be detached from the inner fixed structure by a tension force exerted on the loop.

15. An assembly of an inner fixed structure of a nacelle of an aircraft propulsion unit and of a heat shield comprising at least one heat-shield mat, the heat shield being fastened to the inner fixed structure by at least one fastening device according to claim 1.

* * * * *